(12) United States Patent
Kim

(10) Patent No.: US 12,384,267 B1
(45) Date of Patent: Aug. 12, 2025

(54) METHOD AND APPARATUS FOR PREVENTING SPREAD OF DAMAGE DUE TO FIRE IN ELECTRIC VEHICLE CHARGING STATION IN BUILDING PARKING LOT IN COMMUNICATION SYSTEM

(71) Applicant: Tae Soo Kim, Seoul (KR)

(72) Inventor: Tae Soo Kim, Seoul (KR)

( * ) Notice: Subject to any disclaimer, the term of this patent is extended or adjusted under 35 U.S.C. 154(b) by 0 days.

(21) Appl. No.: 18/977,393

(22) Filed: Dec. 11, 2024

(30) Foreign Application Priority Data

Nov. 4, 2024 (KR) .......................... 10-2024-0154182

(51) Int. Cl.
| | | |
|---|---|---|
| B60L 53/302 | (2019.01) | |
| A62C 2/24 | (2006.01) | |
| A62C 3/07 | (2006.01) | |
| A62C 3/16 | (2006.01) | |
| A62C 35/60 | (2006.01) | |
| A62C 35/68 | (2006.01) | |
| B60L 53/30 | (2019.01) | |
| B60L 53/67 | (2019.01) | |
| G08B 17/06 | (2006.01) | |
| G08B 17/117 | (2006.01) | |

(52) U.S. Cl.
CPC ............ B60L 53/302 (2019.02); A62C 2/247 (2013.01); A62C 3/07 (2013.01); A62C 3/16 (2013.01); A62C 35/605 (2013.01); A62C 35/68 (2013.01); B60L 53/305 (2019.02); B60L 53/67 (2019.02); G08B 17/06 (2013.01); G08B 17/117 (2013.01)

(58) Field of Classification Search
None
See application file for complete search history.

(56) References Cited

U.S. PATENT DOCUMENTS 10,249,158 B1 * 4/2019 Jordan, II ............... H04W 4/02
11,449,064 B1 * 9/2022 Ebrahimi Afrouzi ........................
G05D 1/0231
(Continued)

FOREIGN PATENT DOCUMENTS

KR 10-2023-0073383 A 5/2023
KR 20230073383 A * 5/2023 ............ A62C 2/247
(Continued)

OTHER PUBLICATIONS

"Notice Requesting Submission of Opinion" dated Feb. 13, 2025 for KR 10-2024-0154182.
(Continued)

*Primary Examiner* — Fekadeselassie Girma
(74) *Attorney, Agent, or Firm* — Sughrue Mion, PLLC

(57) ABSTRACT

The present invention relates to a method and apparatus for preventing the spread of damage due to a fire in an electric vehicle charging station in a building parking lot in a communication system. Specifically, the present invention relates to a method and apparatus in which, when a fire is detected in one charging station of a plurality of electric vehicle charging stations installed in a building parking lot in a communication system, the charging station is closed, and a plurality of charging systems cooperate with each other to provide an optimal escape route as well as position information of the origin of the fire and a warning according to a fire situation, thereby minimizing the spread of damage and quickly responding to the fire.

8 Claims, 6 Drawing Sheets

(56) References Cited

U.S. PATENT DOCUMENTS

| | | | | |
|---|---|---|---|---|
| 2014/0152445 A1* | 6/2014 | Krieg | ............... | B60L 58/21 |
| | | | | 340/584 |
| 2019/0168047 A1* | 6/2019 | Conboy | ............. | A62C 37/38 |
| 2022/0009519 A1* | 1/2022 | Shin | ............... | B60L 53/80 |
| 2022/0407174 A1* | 12/2022 | Sandahl | ............. | H01M 50/249 |
| 2024/0082610 A1* | 3/2024 | Shin | ............. | H01M 8/04029 |
| 2024/0106016 A1* | 3/2024 | Le | ............. | H01M 10/482 |
| 2024/0253485 A1* | 8/2024 | Cho | ............. | B60L 53/67 |
| 2024/0350844 A1* | 10/2024 | Yu | ............. | A62C 37/04 |
| 2024/0429725 A1* | 12/2024 | Aronsen | ............. | H02J 7/0045 |
| 2025/0099791 A1* | 3/2025 | Shin | ............. | A62C 3/07 |

FOREIGN PATENT DOCUMENTS

| | | | | | |
|---|---|---|---|---|---|
| KR | 10-2024-0128162 A | | 8/2024 | | |
| KR | 20240128162 A | * | 8/2024 | ............. | B60L 53/30 |
| KR | 10-2024-0147125 A | | 10/2024 | | |
| KR | 20240147125 A | * | 10/2024 | ............. | B60L 53/30 |

OTHER PUBLICATIONS

"Notice of Decision to Grant a Patent" dated Apr. 10, 2025 for KR 10-2024-0154182.

* cited by examiner

METHOD AND APPARATUS FOR PREVENTING SPREAD OF DAMAGE DUE TO FIRE IN ELECTRIC VEHICLE CHARGING STATION IN BUILDING PARKING LOT IN COMMUNICATION SYSTEM

CROSS-REFERENCE TO RELATED APPLICATION

This application claims priority to and the benefit of Korean Patent Application No. 10-2024-0154182, filed on Nov. 4, 2024, the disclosure of which is incorporated herein by reference in its entirety.

BACKGROUND

1. Field of the Invention

The present invention relates to a method and apparatus for preventing the spread of damage due to a fire in an electric vehicle charging station in a building parking lot in a communication system. Specifically, the present invention relates to a method and apparatus in which, when a fire is detected in one charging station of a plurality of electric vehicle charging stations installed in a building parking lot in a communication system, the charging station is closed, and a plurality of charging systems cooperate with each other to provide an optimal escape route as well as position information of the origin of the fire and a warning according to a fire situation, thereby minimizing the spread of damage and quickly responding to the fire.

2. Discussion of Related Art

As the spread of electric vehicles rapidly increases, the importance of electric vehicle charging infrastructures is increasing. In particular, in a situation in which a plurality of electric vehicles are simultaneously charged in a closed space such as a building parking lot, the safety of charging systems is an important issue. Due to the nature of electric vehicle batteries, there is a risk of fire, and fires that occur during charging may lead to large-scale damage, and thus fire prevention and response technologies are essential.

Since electric vehicle fires are accompanied by high heat and toxic gases, rapid detection and response in the early stage are very important. In particular, in closed parking lots, fires may quickly spread and affect other vehicles and building structures. Thus, electric vehicle charging systems require fire detection and rapid response devices, and in particular, there is an increasing need for systems capable of responding locally.

As existing fire response methods, methods using firefighting systems installed throughout a parking lot or using manual fire extinguishers have been mainly used. However, these methods have limitations in that it may be difficult to respond locally after a fire occurs, and unnecessary damage may occur when the firefighting system operates for the entire parking lot in a building. In addition, when an initial response is delayed, there is a high risk that a fire will spread to the entire parking lot and even to the entire building including the parking lot.

In order to solve such problems, fire detection and response systems have been developed for individual electric vehicle charging areas. These systems operate to individually detect fires that occur in charging areas and extinguish the fires in the corresponding areas. However, these systems lack connectivity with other charging systems, which makes the systems insufficient to transmit a warning to other charging areas in a parking lot or prevent the spread of a fire.

In building parking lots in which a plurality of electric vehicle charging systems are installed, cooperation and connectivity between the charging systems is essential. When a fire occurs in one charging area, a warning should be quickly transmitted to other charging areas, and appropriate alert levels and response actions should be able to be automatically initiated in each area. In addition, each charging system should provide an escape exit guide function to provide visual and auditory warnings to users in order for the users to safely evacuate to the nearest escape route in the event of a fire in a parking lot. In particular, a function in which a plurality of charging systems cooperate with each other to provide the optimal escape route in a fire situation plays an important role.

To solve these problems, various embodiments of the present invention propose an electric vehicle charging system having communication and cooperation functions between a plurality of electric vehicle charging systems. The system detects a fire in each charging area, automatically cuts off power of the charger, and isolates the fire through a fireproof cover and a rollable door. In addition, the system quickly extinguishes the fire through a fire extinguishing device and transmits a warning to other charging systems. In addition, a plurality of electric vehicle charging systems in a parking lot of a building cooperate with each other to provide information about a position of the origin of a fire and perform guidance to an escape exit, and provide an optimal escape route according to a fire situation of each charging area such that users may safely escape.

SUMMARY OF THE INVENTION

The present invention is directed to providing a method and apparatus for preventing the spread of damage due to a fire in an electric vehicle charging station in a building parking lot in a communication system.

The present invention is also directed to providing a method and apparatus in which, when a fire is detected in one charging station of a plurality of electric vehicle charging stations installed in a building parking lot in a communication system, the charging station is closed, and a plurality of charging systems cooperate with each other to provide an optimal escape route as well as a warning according to a fire situation, thereby minimizing the spread of damage and quickly responding to the fire.

The present invention is also directed to providing a method and apparatus in which a plurality of electric vehicle charging systems communicate with each other in real time when a fire occurs so that each system receives a fire warning and shares whether the fire has spread, thereby enabling a cooperative response.

The present invention is also directed to providing a method and apparatus in which each charging system adjusts the intensity of a warning according to a distance from the origin of a fire, a position, and a spatial relationship so that a closer system outputs a stronger warning, and unnecessary response actions are excluded to enable an efficient response.

The present invention is also directed to providing a method and apparatus in which a plurality of charging systems provide guidance on an optimal escape route based on whether a fire has spread, and simultaneously provide a warning, position information of the origin of the fire, and escape guidance in order for users to safely evacuate, enhancing real-time collaboration.

The present invention is directed to providing a method and apparatus for efficiently preventing the spread of a fire throughout a parking lot and excluding unnecessary actions by periodically sharing a fire state between charging systems and automatically determining to take only necessary response actions.

According to an aspect of the present invention, there is provided an electric vehicle charging system including a charger for an electric vehicle, a fire detection device including a temperature sensor and a gas detection sensor to detect a fire in an electric vehicle charging space for the electric vehicle; a frame of the electric vehicle charging space, a fireproof cover configured to cover both side surfaces, a rear surface, and an upper end of the electric vehicle charging space based on the frame, a rollable door at a front of the electric vehicle charging space, a fire extinguishing device for the electric vehicle charging space, a warning output device including a visual warning device and an auditory warning device, an inflatable pool capable of wrapping a lower end of the electric vehicle, a liquid supply device capable of supplying a liquid such as water or a coolant to the inflatable pool while controlling a water level, a transceiver, a memory, and a processor functionally connected to the charger, the fire detection device, the rollable door, the fire extinguishing device, the inflatable pool, the liquid supply device, the warning output device, the transceiver, and the memory, wherein the memory stores instructions for operations performed by the processor, and the operations include detecting, by the fire detection device, the fire in the electric vehicle charging space, outputting, by the warning output device, a warning of the fire, cutting off power supply of the charger, closing the rollable door, after closing the rollable door, spraying, by the fire extinguishing device, a fire extinguishing agent into the electric vehicle charging space, inflating and deploying the inflatable pool, and supplying, by the liquid supply device, the liquid such as the water or the coolant to the inflatable pool, wherein information output by the warning output device includes a visual sign and an auditory sign indicating that the electric vehicle charging system is an origin of the fire.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF EXEMPLARY EMBODIMENTS

Hereinafter, embodiments of the present invention will be described in detail with reference to the accompanying drawings so that those skilled in the art may easily practice the present invention. It should be understood that the present invention may be embodied in different ways and is not limited to the following embodiments.

In the various embodiments of the present invention described below, a hardware approach is described as an example. However, since the various embodiments of the present invention include a technology using both hardware and software, the various embodiments of the present invention do not exclude a software-based approach.

Figure 1:
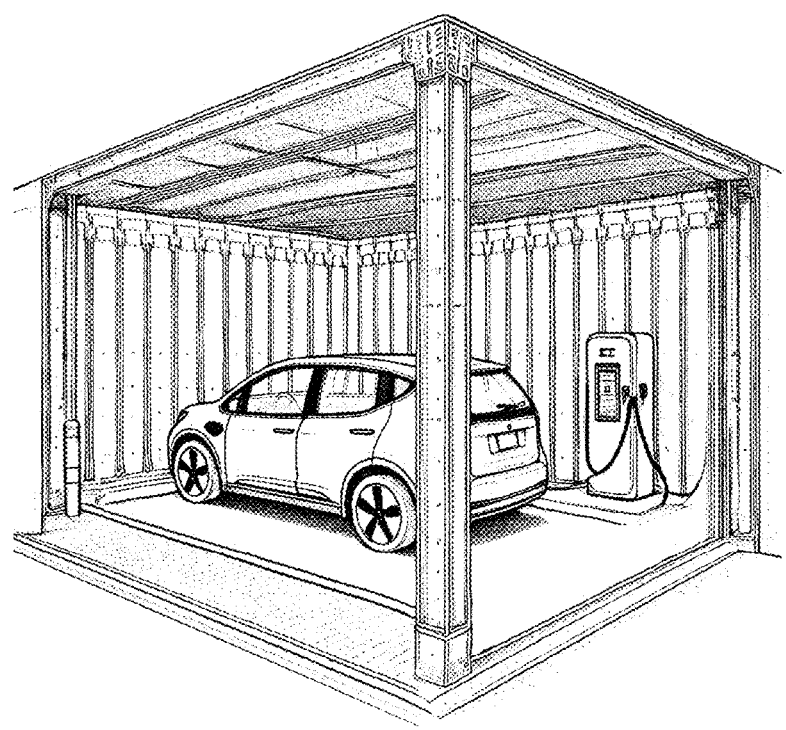
FIG. 1 illustrates an example of an electric vehicle charging system according to various embodiments of the present invention.

FIG. 1 illustrates an example of an electric vehicle charging system according to various embodiments of the present invention.

Referring to FIG. 1, the electric vehicle charging system according to various embodiments of the present invention includes a charger for charging an electric vehicle. The electric vehicle charging system includes a frame to partition an electric vehicle charging space for one electric vehicle. The electric vehicle charging system includes a fireproof cover covering both side surfaces, a rear surface, and an upper end of the electric vehicle charging space based on the frame. In addition, in order to prevent the spread of a fire within the electric vehicle charging space, the electric vehicle charging system includes a rollable door at the front of the electric vehicle charging space to seal the electric vehicle charging space.

In addition, although not shown in FIG. 1, the electric vehicle charging system according to various embodiments of the present invention includes a fire detection device including a temperature sensor and a gas detection sensor to detect a fire in the electric vehicle charging space. The electric vehicle charging system includes a fire extinguishing device for quickly extinguishing a fire in the electric vehicle charging space. The electric vehicle charging system includes a warning output device including a visual warning device and an auditory warning device to notify people nearby of a situation such as fire occurrence in the event of a fire in the electric vehicle charging space. The electric vehicle charging system includes a transceiver for automatically controlling the operation of the electric vehicle charging system and performing communication to cooperate with other electric vehicle charging systems in a building parking lot, a memory, and a processor functionally connected to the charger, the fire detection device, the rollable door, the fire extinguishing device, the warning output device, the transceiver, and the memory.

Figure 2:
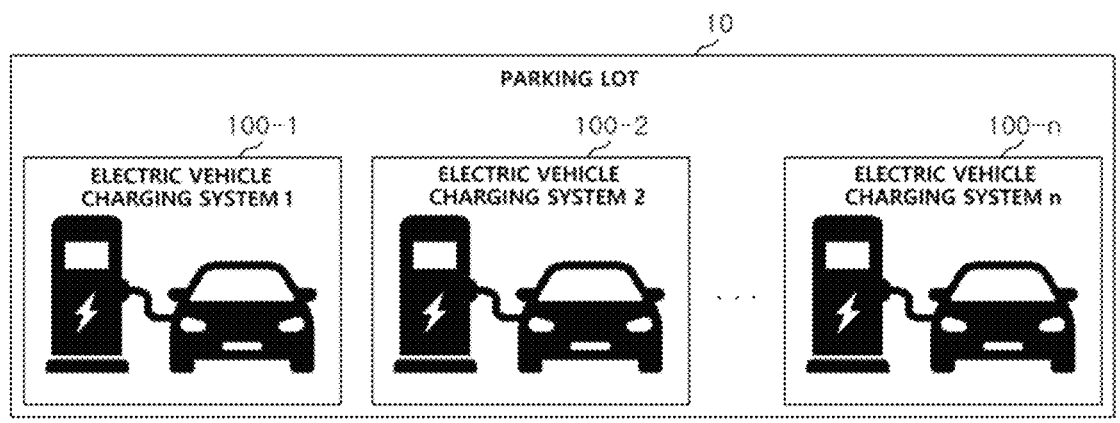
FIG. 2 illustrates an example of an electric vehicle charging system according to various embodiments of the present invention.

FIG. 2 illustrates an example of an electric vehicle charging system according to various embodiments of the present invention.

Referring to FIG. 2, a building parking lot 10 includes a plurality of electric vehicle charging systems 100 (100-1, 100-2, . . . , and 100-*n*).

Each of the plurality of electric vehicle charging systems 100 (100-1, 100-2, . . . and 100-*n*) is partitioned as an electric vehicle charging space for one electric vehicle.

The building parking lot 10 may include a plurality of floors. In addition, the building parking lot 10 may include a plurality of underground floors, a plurality of above-ground floors, or a plurality of floors including both underground floors and above-ground floors. The plurality of floors in the building parking lot 10 may each include the plurality of electric vehicle charging systems. The plurality of floors in the building parking lot 10 may each include at least one escape route leading to a ground level.

Figure 3:
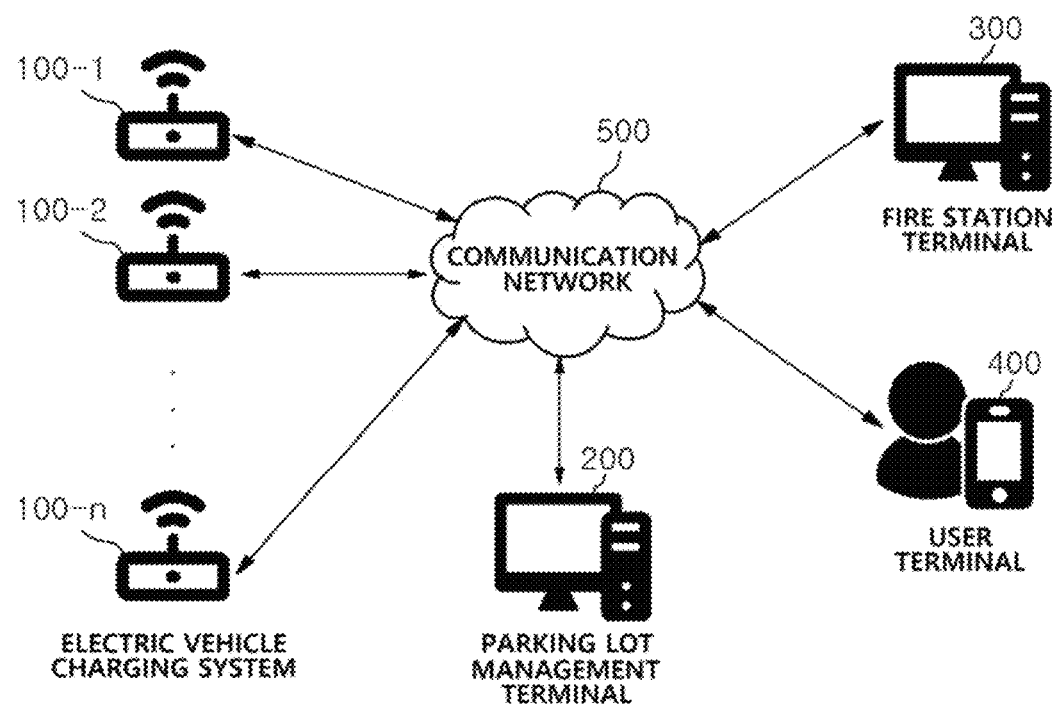
FIG. 3 illustrates an example of a communication system according to various embodiments of the present invention.

FIG. 3 illustrates an example of a communication system according to various embodiments of the present invention.

Referring to FIG. 3, a communication system according to various embodiments of the present invention includes an electric vehicle charging system 100 (100-1, 100-2, . . . , and 100-n), a parking lot management terminal 200, a fire station terminal 300, a user terminal 400, and a wired/wireless communication network 500.

The electric vehicle charging system 100 (100-1, 100-2, . . . , or 100-n) is a terminal in which an electric vehicle charging space for one electric vehicle is partitioned and which is capable of electrically controlling various devices in the electric vehicle charging space and communicating with other devices. The electric vehicle charging system 100 (100-1, 100-2, . . . , or 100-n) is an electronic device capable of transmitting or receiving information to or from other electric vehicle charging systems 100 (100-1, 100-2, . . . , and 100-n), the parking lot management terminal 200, the fire station terminal 300, and the user terminal 400 through the wired/wireless communication network 500. The electric vehicle charging system 100 (100-1, 100-2, . . . , or 100-n) may be an electronic device such as a personal computer, a cellular phone, a smartphone, a tablet computer, a telematics device, or a server device which includes a memory capable of inputting and storing information, a transceiver capable of transmitting or receiving information, and at least one processor capable of performing a calculation on information.

The parking lot management terminal 200 is a terminal operated by a parking lot manager. The parking lot management terminal 200 is an electronic device capable of transmitting or receiving information to or from the electric vehicle charging system 100 (100-1, 100-2, . . . , and 100-n), the fire station terminal 300, and the user terminal 400 through the wired/wireless communication network 500. The parking lot management terminal 200 may be an electronic device such as a personal computer, a cellular phone, a smartphone, or a tablet computer which includes an input device capable of inputting information, an output device capable of outputting information, a memory capable of storing information, a transceiver capable of transmitting or receiving information, and at least one processor capable of performing a calculation on information.

The fire station terminal 300 is a terminal operated by a fire service organization, a fire station, or a firefighter. The fire station terminal 300 is an electronic device capable of transmitting or receiving information to or from the electric vehicle charging system 100 (100-1, 100-2, . . . , and 100-n), the parking lot management terminal 200, and the user terminal 400 through the wired/wireless communication network 500. The fire station terminal 300 may be an electronic device such as a personal computer, a cellular phone, a smartphone, or a tablet computer which includes an input device capable of inputting information, an output device capable of outputting information, a memory capable of storing information, a transceiver capable of transmitting or receiving information, and at least one processor capable of performing a calculation on information.

The user terminal 400 is a terminal operated by a user who charges an electric vehicle with one or more of the electric vehicle charging systems 100 (100-1, 100-2, . . . , and 100-n). The user terminal 400 is an electronic device capable of transmitting or receiving information to or from the electric vehicle charging system 100 (100-1, 100-2, . . . , and 100-n), the parking lot management terminal 200, and the fire station terminal 300 through the wired/wireless communication network 500. The user terminal 400 may be an electronic device such as a personal computer, a cellular phone, a smartphone, or a tablet computer which includes an input device capable of inputting information, an output device capable of outputting information, a memory capable of storing information, a transceiver capable of transmitting or receiving information, and at least one processor capable of performing a calculation on information.

The wired/wireless communication network 500 provides a communication path through which the electric vehicle charging system 100 (100-1, 100-2, . . . , and 100-n), the parking lot management terminal 200, the fire station terminal 300, and the user terminal 400 may transmit or receive signals and data to or from each other. The wired/wireless communication network 500 is not limited to a communication method according to a specific communication protocol, and an appropriate communication method may be used according to embodiments. For example, when the wired/wireless communication network 500 is constructed as a system based on the Internet protocol (IP), the wired/wireless communication network 500 may be implemented as a wired/wireless Internet network, and when the electric vehicle charging system 100 (100-1, 100-2, . . . , and 100-n), the parking lot management terminal 200, the fire station terminal 300, and the user terminal 400 are implemented as mobile communication terminals, the wired/wireless communication network 500 may be implemented as a wireless network such as a cellular network or a wireless local area network (WLAN).

Figure 4:
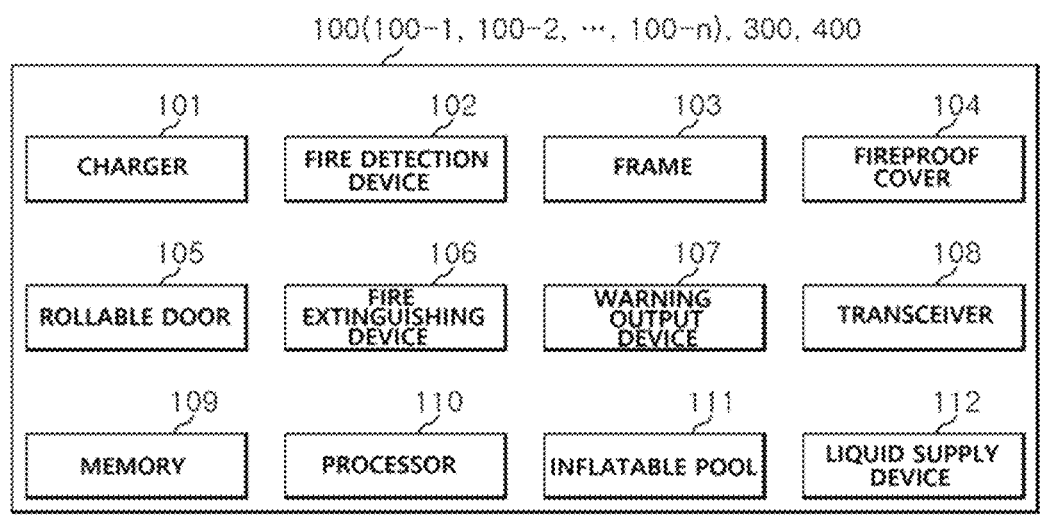
FIG. 4 illustrates a block diagram of a configuration of an electric vehicle charging system according to various embodiments of the present invention.

FIG. 4 illustrates a block diagram of a configuration of an electric vehicle charging system according to various embodiments of the present invention.

Referring to FIG. 4, an electric vehicle charging system 100 (100-1, 100-2, . . . and 100-n) includes a charger 101, a fire detection device 102, a frame 103, a fireproof cover 104, a rollable door 105, a fire extinguishing device 106, a warning output device 107, a transceiver 108, a memory 109, a processor 110, an inflatable pool 111, and a liquid supply device 112.

The charger 101 is a basic component of the electric vehicle charging system 100 (100-1, 100-2, . . . , or 100-n) and is a device for charging a battery of an electric vehicle. The charger 101 supplies stable power in an electric vehicle charging area and also automatically cuts off power supply in the event of a fire.

The fire detection device 102 is a device including a temperature sensor and a gas detection sensor and performs a function of detecting a fire in an electric vehicle charging space. The fire detection device 102 quickly detects a fire and transmits a signal to other components to operate.

The frame 103 is a structural support device that partitions an electric vehicle charging space and forms a basic frame of a charging area. The fireproof cover, the rollable door and the like are installed based on the frame, and the frame physically partitions the electric vehicle charging space.

The fireproof cover 104 is a cover that covers both side surfaces, a rear surface, and an upper end of the charging area and serves to prevent a fire from spreading to the outside. The fireproof cover 104 is made of a fire-resistant material to safely protect the charging area in case of a fire.

The rollable door 105 is a door that covers the front of the electric vehicle charging area and is automatically closed to seal the charging area in the event of a fire. The rollable door 105 may play an important role in blocking the charging area to prevent the spread of a fire and may also have a function of being opened and closed manually when necessary.

The fire extinguishing device 106 is a device that automatically sprays a fire extinguishing agent in the event of a fire to extinguish the fire. The fire extinguishing device 106 may be installed in the electric vehicle charging area and is configured to quickly extinguish a fire in the charging space after the rollable door is closed.

The warning output device 107 is a device that notifies people nearby of a fire situation through visual and auditory warnings in the event of a fire. The warning output device 107 includes a light-emitting diode (LED) lamp, a warning light, a display, a speaker, a siren, and the like. The warning output device 107 may be configured to transmit a fire warning not only to an area of the electric vehicle charging system that includes the warning output device 107, but also to other electric vehicle charging systems.

The transceiver 108 is connected to the processor 130 and transmits and/or receives signals. The entirety or a portion of the transceiver 108 may be referred to as a transmitter or a receiver. The transceiver 108 may support at least one of various wireless communication standards such as an Institute of Electrical and Electronics Engineers (IEEE) 802.xx system, an IEEE Wi-Fi system, a $3^{rd}$ Generation Partnership Project (3GPP) system, a 3GPP Long Term Evolution (LTE) system, a 3GPP 5G New Radio (NR) system, a 3GPP2 system, and Bluetooth which are wired access systems and wireless access systems.

The memory 109 may be connected to the transceiver 108 and may store information or the like received through communication. In addition, the memory 109 may be connected to the processor 130 and may store data such as a basic program for the operation of the processor 110, an application program, setting information, and information generated through a calculation of the processor 110. The memory 109 may include a volatile memory, a nonvolatile memory, or a combination of a volatile memory and a nonvolatile memory. In addition, the memory 109 may provide stored data according to a request of the processor 110.

The processor 110 may be configured to implement procedures and/or methods proposed in the present invention. The processor 110 controls the overall operations of the electric vehicle charging system 100 (100-1, 100-2, . . . , and 100-$n$) that receives information using a communication system, generates new information based on the received information, stores the generated information, and transmits the received information or the generated information. For example, the processor 110 transmits or receives information or the like through the transceiver 108. In addition, the processor 110 records and reads data to and from the memory 109. In addition, the processor 110 supplies or cuts off electricity through the charger 101. In addition, the processor 110 detects a fire through the fire detection device 102. In addition, the processor 110 opens or closes the electric vehicle charging space by opening or closing a door at the front of the electric vehicle charging space through the rollable door 105. In addition, the processor 110 sprays a fire extinguishing powder through the fire extinguishing device 106. In addition, the processor 110 outputs a visual sign and an auditory sign related to a fire warning through the warning output device 107. In addition, the processor 110 inflates and deploys the inflatable pool 111. In addition, the processor 110 supplies a liquid such as water or a coolant to the inflatable pool 111 through the liquid supply device 112 while controlling the water level. The processor 110 may include at least one processor.

The inflatable pool 111 is an air bed-type water tank that rapidly expands to submerge a vehicle in the event of an electric vehicle fire. During a fire suppression operation, a bottom of a pool may be designed to come into contact with a lower portion of a vehicle to suppress thermal runaway. The inflatable pool 111 may be designed to quickly inflate through an automatic inflation mechanism in the event of a fire to allow a vehicle to be safely submerged. Such a process includes the following operations. (1) A fire detection and expansion instruction: when the fire detection device 102 of the electric vehicle charging system 100 (100-1, 100-2, . . . , or 100-$n$) detects a fire, the processor 110 automatically controls and instructs the inflatable pool to inflate. (2) An air pump operation: an air pump embedded in the inflatable pool 111 operates to quickly inject air into the inflatable pool 111. Thus, the wall and bottom of the inflatable pool 111 are sequentially inflated and expanded to a set size. (3) An arrangement in close contact with a lower portion of a vehicle: the bottom of the inflatable pool 11 is designed to come into close contact with the lower portion of the vehicle so that when inflation is complete, the inflatable pool 11 stably wraps the lower portion of the vehicle. Thus, a liquid such as a coolant or water filling the inflatable pool 111 may come into direct contact with a battery to lower a temperature and maximize a fire suppression effect.

The liquid supply device 112 quickly fills the inflatable pool 111 with a liquid such as a coolant or water to submerge a vehicle battery section and extinguish a fire. The liquid supply device 112 supplies a liquid at an appropriate pressure to efficiently support fire suppression and battery cooling.

Figure 5:
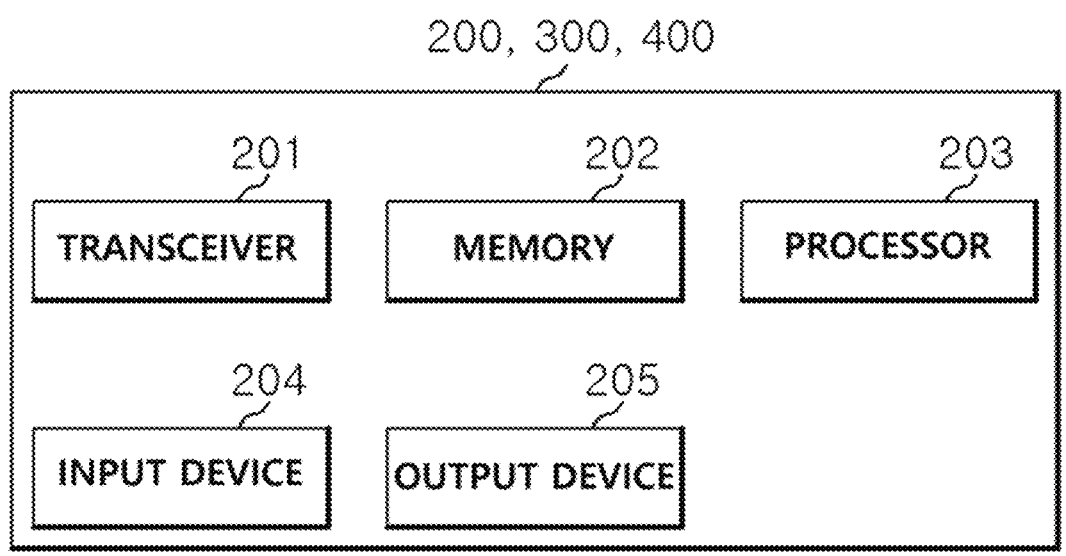
FIG. 5 illustrates a block diagram of a configuration of a parking lot management terminal, a fire station terminal, and a user terminal according to various embodiments of the present invention.

FIG. 5 illustrates a block diagram of a configuration of a parking lot management terminal, a fire station terminal, and a user terminal according to various embodiments of the present invention.

A parking lot management terminal 200, a fire station terminal 300, and a user terminal 400 according to various embodiments of the present invention each include a transceiver 201, a memory 202, a processor 203 an input device 204, and an output device 205.

The transceiver 201 is connected to a processor 203 and transmits and/or receives signals. The entirety or a portion of the transceiver 201 may be referred to as a transmitter or a receiver. The transceiver 201 may support at least one of various wireless communication standards such as an Institute of IEEE 802.xx system, an IEEE Wi-Fi system, a 3GPP system, a 3GPP LTE system, a 3GPP 5G NR system, a 3GPP2 system, and Bluetooth which are wired access systems and wireless access systems.

The memory 202 may be connected to the transceiver 201 and may store information or the like received through communication. In addition, the memory 202 may be connected to the processor 203 and may store data such as a basic program for the operation of the processor 203, an application program, setting information, and information generated through a calculation of the processor 203. The memory 202 may include a volatile memory, a nonvolatile memory, or a combination of a volatile memory and a nonvolatile memory. The memory 202 may provide stored data according to a request of the processor 203.

The processor 203 may be configured to implement procedures and/or methods proposed in the present invention. The processor 203 controls the overall operations of the parking lot management terminal 200, the fire station terminal 300, and the user terminal 400 that receive information using a communication system, generate new information based on the received information, store the generated information, and transmit the received information or the generated information. For example, the processor 203 transmits or receives information or the like through the transceiver 201. In addition, the processor 203 records and reads data to and from the memory 202. In addition, the processor 203 receives information through the input device 204. In addition, the processor 203 outputs information through the output device 205. The processor 203 may include at least one processor.

The input device 204 may be connected to the processor 203 and may input information or the like. According to one embodiment, the input device 204 may input information or the like received from another device through the transceiver 201. The input device 204 may include a touch display, a key pad, a keyboard, or the like.

The output device 205 may be connected to the processor 203 and may output information or the like in the form of an image/voice or the like. According to one embodiment, the output device 205 may output information or the like received from another device through the transceiver 201. The output device 205 may include a display, a speaker, and the like.

Figure 6:
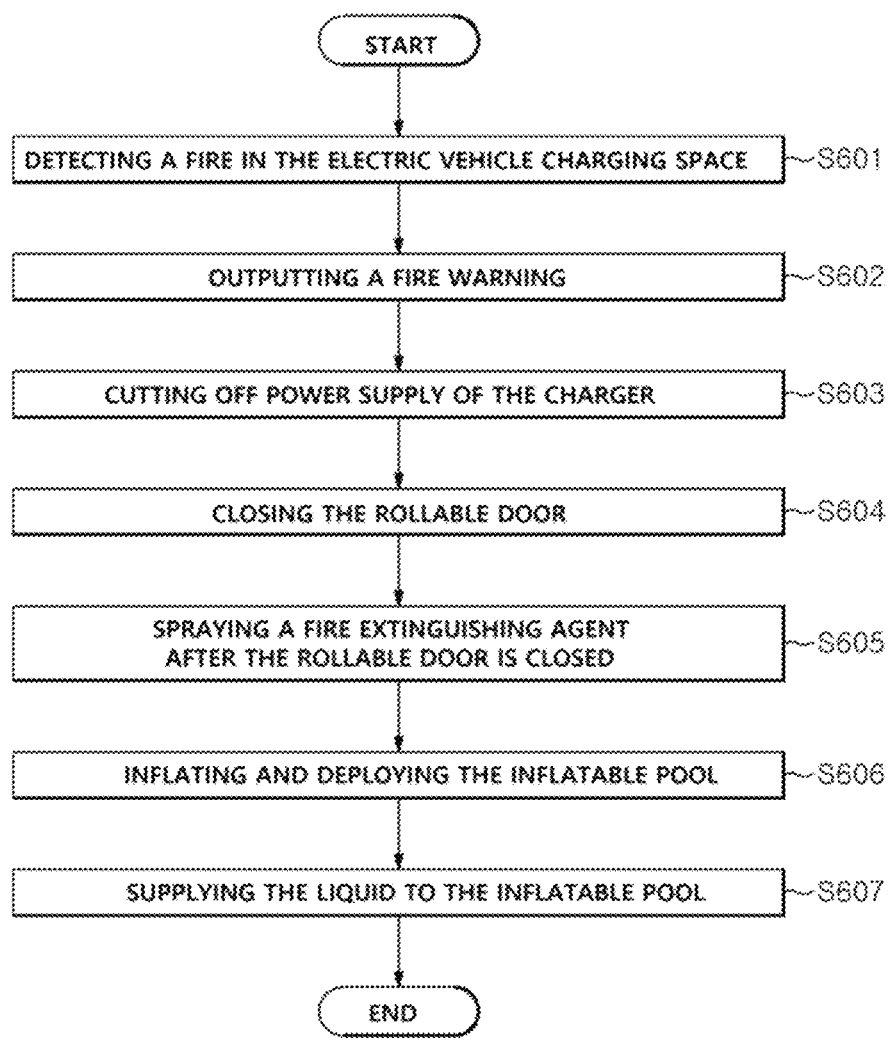
FIG. 6 illustrates a flowchart of a method of operating an electric vehicle charging system according to various embodiments of the present invention.

FIG. 6 illustrates a flowchart of a method of operating an electric vehicle charging system according to various embodiments of the present invention.

In the embodiment of FIG. 6, the electric vehicle charging system includes a charger for an electric vehicle, a fire detection device including a temperature sensor and a gas detection sensor for detecting a fire in an electric vehicle charging space for the electric vehicle, a frame of the electric vehicle charging space, a fireproof cover covering both side surfaces, a rear surface, and an upper end of the electric vehicle charging space based on the frame, a rollable door at the front of the electric vehicle charging space, a fire extinguishing device for the electric vehicle charging space, a warning output device including a visual warning device and an auditory warning device, an inflatable pool capable of wrapping an upper end of the electric vehicle, a liquid supply device capable of supplying a liquid such as water or a coolant to the inflatable pool while controlling a water level, a transceiver, a memory, and a processor functionally connected to the charger, the fire detection device, the rollable door, the fire extinguishing device, the inflatable pool, the liquid supply device, the warning output device, the transceiver, and the memory. The memory stores instructions for operations performed by the processor.

Referring to FIG. 6, in operation S601, the electric vehicle charging system detects a fire in the electric vehicle charging space through the fire detection device.

In operation S602, the electric vehicle charging system outputs a fire warning through the warning output device. Information output by the warning output device includes visual and auditory signs indicating that the electric vehicle charging system is the origin of a fire. The information output by the warning output device may be configured to clearly identify the origin of a fire by outputting visual and auditory signs of different content that is distinguished from that of other electric vehicle charging systems included in a plurality of electric vehicle charging systems in a parking lot including the electric vehicle charging system. The origin of a fire may be quickly identified through such warning signs so that firefighters and evacuees may more clearly recognize fire suppression and evacuation routes.

In operation S603, the electric vehicle charging system cuts off power supply of the charger.

In operation S604, the electric vehicle charging system closes the rollable door.

In operation S605, the electric vehicle charging system sprays a fire extinguishing agent into the electric vehicle charging space through the fire extinguishing device after the rollable door is closed.

In operation S606, the electric vehicle charging system inflates and deploys the inflatable pool. The inflatable pool is an electric vehicle firefighting submersion pool. An inflatable pool or electric vehicle firefighting submersion pool is a deployable water tank designed to safely submerge an electric vehicle in the event of a fire, thereby suppressing thermal runaway caused by a battery fire and preventing the additional spread of the fire. The water tank serves to extinguish a fire by partially or fully submerging a vehicle in water.

In operation S607, the electric vehicle charging system supplies the liquid such as the water or the coolant to the inflatable pool through the liquid supply device.

According to various embodiments of the present invention, the liquid supply device may be configured to control a water level of the liquid such as the water or the coolant in the inflatable pool according to an extent of the fire.

According to various embodiments of the present invention, before a threshold fire duration immediately after the fire occurs, the liquid supply device may be configured to control the water level of the liquid to be lower than a threshold level such that only a portion of a battery pack of the electric vehicle may be submerged.

According to various embodiments of the present invention, when a temperature in the system exceeds a threshold temperature or a concentration of a specific gas in the system exceeds a threshold concentration and thermal runaway of the battery pack of the electric vehicle is detected, or when the fire continues for the threshold fire duration or more, the liquid supply device may be configured to adjust the water level of the liquid to be lower than the threshold level such that the entire battery pack of the electric vehicle may be submerged.

According to various embodiments of the present invention, the operation of the fire extinguishing device and the operations of the inflatable pool and the liquid supply device may be performed complementary to each other.

According to various embodiments of the present invention, when the fire extinguishing device does not operate normally despite control of the operation of the fire extinguishing device, the liquid supply device may be configured to raise the water level of the liquid in the inflatable pool to be higher than a normal level. The normal level of the water level of the liquid is a water level of the liquid expected based on the control of the operations of the inflatable pool and the liquid supply device when the fire extinguishing device operates normally, that is, when a ratio of a spray pressure expected based on the control of the operation of the fire extinguishing device to a spray pressure measured by a spray pressure sensor of the fire extinguishing device is within a set range, for example, between 90% and 100%.

An extent to which the liquid supply device raises the water level of the liquid to be higher than the normal level may be based on an extent of abnormality of the fire extinguishing device. The fire extinguishing device not operating normally may mean that the fire extinguishing device cannot spray a fire extinguishing agent at a set pressure or cannot spray the fire extinguishing agent at all. An extent to which, when the fire extinguishing device does not operate normally, the liquid supply device additionally raises the water level as compared to when the fire extinguishing device operates normally may be based on an extent of failure of the fire extinguishing device or an extent of abnormality of the fire extinguishing device. The extent of abnormality of the fire extinguishing device may be calculated as a ratio of the spray pressure expected based on the control of the operation of the fire extinguishing device to the spray pressure measured by the spray pressure sensor of the fire extinguishing device. The electric vehicle charging system may further include the spray pressure sensor for measuring the spray pressure of the fire extinguishing device. The spray pressure sensor may be connected to and controlled by a processor within the electric vehicle charging system. The spray pressure of the fire extinguishing device may be measured through the spray pressure sensor. For example, when the fire extinguishing device operates, but the spray pressure of the fire extinguishing agent sprayed by the fire extinguishing device is lowered to 80% of a normal level, that is, the spray pressure of the fire extinguishing agent sprayed by the fire extinguishing device is 20% below the normal level, the liquid supply device may operate to additionally raise the water level by 20%. When the fire extinguishing device operates, but the spray pressure of the fire extinguishing agent sprayed by the fire extinguishing device is lowered to 50% of the normal level, that is, the spray pressure of the fire extinguishing agent sprayed by the fire extinguishing device is 50% below the normal level, the liquid supply device may operate to additionally raise the water level by 50%. When the fire extinguishing device does not operate at all, that is, the spray pressure of the fire extinguishing agent sprayed by the fire extinguishing device is 100% below the normal level, the liquid supply device may operate to additionally raise the water level by 100%.

According to various embodiments of the present invention, when the inflatable pool is not inflated and deployed normally or the liquid supply device is not operated normally despite control of the operations of the inflatable pool and the liquid supply device, the fire extinguishing device may be configured to increase a spray pressure of the fire extinguishing agent sprayed by the fire extinguishing device to be higher than a normal level. The normal level of the spray pressure of the fire extinguishing agent sprayed by the fire extinguishing device is a spray pressure expected based on the control of the operation of the fire extinguishing device when the inflatable pool and the liquid supply device operate normally, that is, when a ratio of a water level expected based on the control of the operations of the inflatable pool and the liquid supply device to a water level of the liquid in the inflatable pool measured by an ultrasonic water level sensor is within a set range, for example, between 90% and 100%.

An extent to which the fire extinguishing device increases an output of the fire extinguishing agent, that is, an amount or pressure of the sprayed fire extinguishing agent above the normal level, may be based on an extent of abnormality of the inflatable pool or the liquid supply device. The inflatable pool not being inflated and deployed normally may mean that the inflatable pool is not sufficiently inflated within a set time or an air pressure is lower than a reference pressure. The liquid supply device not being operated normally may mean that the inflatable pool is not filled with the liquid such as the coolant or the water to a set water level within a set time. An extent to which the fire extinguishing device additionally sprays the fire extinguishing agent when the liquid supply device does not operate normally as compared to when the liquid supply device operates normally may be based on an extent of failure of the inflatable pool or the liquid supply device or an extent of abnormality of the inflatable pool or the liquid supply device. The extent of abnormality of the inflatable pool or the liquid supply device may be calculated as a ratio of a water level based on the control of the operations of the inflatable pool and the liquid supply device to a water level of the liquid in the inflatable pool measured by the ultrasonic water level sensor. The electric vehicle charging system may further include the ultrasonic water level sensor for measuring the water level of the liquid in the inflatable pool. The ultrasonic water level sensor may be connected to and controlled by the processor in the electric vehicle charging system. The ultrasonic water level sensor may be positioned at an upper portion inside the inflatable pool to calculate a water level by measuring a time taken for ultrasonic waves to be reflected on a liquid surface and returned. For example, when the inflatable pool is inflated and deployed normally, and the liquid supply device is operated, but a water level of the liquid in the inflatable pool is lowered to 80% of a normal level, that is, the water level of the liquid in the inflatable pool is 20% below the normal level, the fire extinguishing device may spray the fire extinguishing agent to additionally increase a spray pressure of the fire extinguishing agent by 20%. When the inflatable pool is inflated and deployed normally, and the liquid supply device is operated, but the water level of the liquid in the inflatable pool is lowered to 50% of the normal level, that is, the water level of the liquid in the inflatable pool is 50% below the normal level, the fire extinguishing device may spray the fire extinguishing agent to additionally increase the spray pressure of the fire extinguishing agent by 50%. When the inflatable pool is abnormally inflated and abnormally disposed, the liquid supply device is not operated at all, or the inflatable pool is not filled with the liquid at all, that is, the water level of the liquid in the inflatable pool is lowered by 100%, the fire extinguishing device may spray the fire extinguishing agent to additionally increase the spray pressure of the fire extinguishing agent by 100%.

In the configuration of the present invention, a method in which the fire extinguishing device, the inflatable pool, and the liquid supply device operate complementary to each other greatly improves the safety and efficiency of a system. By detecting a failure or abnormal operation of each device in real time, and responding to the failure or abnormal operation, the entire system may operate smoothly. For example, when the spray pressure of the fire extinguishing device is lower than a normal level, the liquid supply device automatically increases a water level in the inflatable pool to supplement the fire suppression performance.

In addition, through a configuration in which the liquid supply device additionally raises a water level when the fire extinguishing device does not operate normally, a flexible response is possible according to a fire situation. When the fire extinguishing device does not operate normally, a water level may be gradually adjusted according to an extent of failure, thereby maximizing a cooling effect and ensuring efficient fire suppression. Thus, each device in a system performs a certain role to perform a complementary response.

When the inflatable pool or the liquid supply device does not operate normally, the fire extinguishing device may effectively compensate for the deficiency by increasing a spray pressure of the fire extinguishing agent. For example, when the inflatable pool is not sufficiently inflated, or a water level in the liquid supply device is lower than a normal level, the fire extinguishing device may increase a spray pressure to maintain the performance of the entire system. Thus, there is an effect of ensuring the stability of a system by responding appropriately according to an extent of abnormality of each device.

Such a system configuration has a very important technical effect in fire suppression and enables real-time monitoring of a state of each device and additional response to abnormal situations. Such a configuration provides high reliability in various situations and enables safe system operation that may significantly increase a success rate of fire suppression.

According to various embodiments of the present invention, the electric vehicle charging system may be one of a plurality of electric vehicle charging systems in a parking lot including the electric vehicle charging system. Each of the plurality of electric vehicle charging systems may have the same structure as the above-described electric vehicle charging system.

According to various embodiments of the present invention, the operations according to the embodiments of FIG. 6 may further include transmitting a message notifying other electric vehicle charging systems included in the plurality of electric vehicle charging systems of detection of a fire in the electric vehicle charging system, generating, by the fire detection device, state information of the fire at a preset period until the fire is extinguished, wherein the state information includes an extent of occurrence of the fire or an extent of extinguishment of the fire after the fire extinguishing device sprays the fire extinguishing agent, determining fire response stage information of each of the other electric vehicle charging systems based on the state information of the fire at the preset period, and transmitting the fire response stage information to the other electric vehicle charging systems at the preset period.

According to various embodiments of the present invention, the operations according to the embodiments of FIG. 6 may further include transmitting a message notifying a management terminal of the parking lot, a fire station terminal, and one or more user terminals registered in relation to the parking lot of the detection of the fire and a position of the electric vehicle charging system.

According to various embodiments of the present invention, the fire response stage information may include response operations to be performed by each of the other electric vehicle charging systems in response to receiving warning stage information and fire warning stage information. The response operations may include one or more of an operation of outputting a warning of the fire, an operation of cutting off power supply of a charger in each of the other electric vehicle charging systems, an operation of closing the rollable door, and an operation of spraying the fire extinguishing agent. In each of the other electric vehicle charging systems, the warning of the fire may be output based on the warning stage information.

According to various embodiments of the present invention, the memory may further include arrangement information of the plurality of electric vehicle charging systems in the parking lot. The warning stage information may be generated based on a hierarchy according to a distance from each of the other electric vehicle charging systems to the electric vehicle charging system and a floor difference. The warning stage information may include visual warning information and auditory warning information. As the tier determined for each of the other electric vehicle charging systems becomes higher, the brightness and blinking frequency of the visual warning information may be increased, and the color of the visual warning information may be changed. As the tier determined for each of the other electric vehicle charging systems becomes higher, the volume or frequency of the auditory warning information may be increased. Matching different colors with each tier is an effective way to provide appropriate visual warnings based on a risk level. It is important to gradationally arrange colors, which raise awareness or require attention, in consideration of a risk level of each tier and a distance from the origin of a fire. Red warns of immediate danger and an emergency situations and indicates a need for quick evacuation. Orange indicates a dangerous but somewhat less urgent situation and a need for quick response. Yellow indicates a relatively low risk but a need for caution. Green indicates an evacuation route while indicating a relatively safe situation.

According to various embodiments of the present invention, each of the other electric vehicle charging systems may be configured as follows in relation to the hierarchy: each of the other electric vehicle charging systems may belong to a first tier when each of the other electric vehicle charging systems corresponds to the same floor as the electric vehicle charging system and is within a threshold distance from the electric vehicle charging system. Each of the other electric vehicle charging systems may belong to a second tier when each of the other electric vehicle charging systems corresponds to the same floor as the electric vehicle charging system and is outside the threshold distance from the electric vehicle charging system. Each of the other electric vehicle charging systems may belong to a third tier when each of the other electric vehicle charging systems corresponds to a different floor from the electric vehicle charging system and corresponds to a floor that is further away from a ground surface than the electric vehicle charging system. Each of the other electric vehicle charging systems may belong to a fourth tier when each of the other electric vehicle charging systems corresponds to a different floor from the electric vehicle charging system and corresponds to a floor that is closer to the ground surface than the electric vehicle charging system. The threshold distance may be any distance between 30 meters and 50 meters. Areas less than 30 meters to 50 meters away from the origin of a fire, are areas in which an immediate warning and rapid evacuation are required in the event of a fire and which are most affected by smoke or heat spread. Areas 50 meters or more away from the origin of a fire are areas which are physically further away from the origin of a fire and thus are relatively less dangerous, but still require caution. The first tier, the second tier, the third tier, and the fourth tier may be in order of height. The first tier may be the highest among the first tier, the second tier, the third tier, and the fourth tier.

According to various embodiments of the present invention, the response operations to be performed by each of the other electric vehicle charging systems in response to receiving the warning stage information may differ according to the hierarchy of the other electric vehicle charging systems.

According to various embodiments of the present invention, when each of the other electric vehicle charging systems belongs to the first tier, the response operations may include outputting the warning of the fire at a first intensity as well as in a red visual sign, cutting off power supply of the charger, closing the rollable door, spraying the fire extinguishing agent, inflating and deploying the inflatable pool, and supplying the liquid such as the water or the coolant to the inflatable pool.

According to various embodiments of the present invention, when each of the other electric vehicle charging systems belongs to the second tier, the response operations may include outputting the warning of the fire at a second intensity as well as in an orange visual sign, cutting off power supply of the charger, closing the rollable door, and spraying the fire extinguishing agent under a condition in which a temperature in each of the other electric vehicle charging systems exceeds a threshold temperature or a concentration of a specific gas exceeds a threshold concentration.

According to various embodiments of the present invention, when each of the other electric vehicle charging systems belongs to the third tier, the response operations may include outputting the warning of the fire at a third intensity as well as in a yellow visual sign, cutting off the power supply of the charger and closing the rollable door under a condition in which the temperature in each of the other electric vehicle charging systems exceeds the threshold temperature or the concentration of the specific gas exceeds the threshold concentration.

According to various embodiments of the present invention, when each of the other electric vehicle charging systems belongs to the fourth tier, the response operations may include outputting the warning of the fire at a fourth intensity as well as in a green visual sign, and cutting off power supply of the charger under a condition in which the temperature in each of the other electric vehicle charging systems exceeds the threshold temperature.

According to various embodiments of the present invention, the threshold temperature may be any temperature between 60 degrees Celsius and 75 degrees Celsius or any temperature between 140 degrees Fahrenheit and 167 degrees Fahrenheit.

According to various embodiments of the present invention, the threshold concentration of the specific gas may be any carbon monoxide concentration of 50 ppm to 100 ppm, a carbon dioxide concentration of 1,000 ppm, or a concentration of a volatile organic compound (VOC) of 0.5 ppm to 1 ppm.

According to various embodiments of the present invention, the intensity of the warning of the warning may be related to the brightness, blinking frequency, and color of the visual warning information and the volume or frequency of the auditory warning information. The first intensity, the second intensity, the third intensity, and the fourth intensity may be in order of height. The first intensity may be the highest among the first intensity, the second intensity, the third intensity, and the fourth intensity.

According to various embodiments of the present invention, the brightness, blinking frequency, and color of the visual warning information included in the warning stage information, and the volume or frequency of the auditory warning information may be determined according to the hierarchy. The content of the visual warning information may include visual sign information providing guidance on a direction of an escape exit in the parking lot. When each of the other electric vehicle charging systems belongs to the first tier, the content of the visual warning information may further include position information of the electric vehicle charging system corresponding to the origin of the fire. The origin of a fire may be quickly identified through such warning signs so that firefighters and evacuees may more clearly recognize fire suppression and evacuation routes. The content of the auditory warning information may include a voice providing guidance on a direction of an escape exit.

According to various embodiments of the present invention, when each of the other electric vehicle charging systems belongs to the first tier or the second tier, the content of the visual warning information and the auditory warning information may include information about a distance from each of the other electric vehicle charging systems to the electric vehicle charging system, visual sign information and a guidance voice providing guidance on a direction of an escape exit positioned away from the electric vehicle charging system. When each of the other electric vehicle charging systems belongs to the third tier, the content of the visual warning information and the auditory warning information may include information about a distance from each of the other electric vehicle charging systems to the electric vehicle charging system, visual sign information and a guidance voice providing guidance on a direction of an escape exit positioned horizontally away from the electric vehicle charging system. When each of the other electric vehicle charging systems belongs to the fourth tier, the content of the visual warning information and the auditory warning information may include information about a distance from each of the other electric vehicle charging systems to the electric vehicle charging system, visual sign information and a guidance voice providing guidance on a direction of an escape exit positioned closest to each of the other electric vehicle charging systems.

According to various embodiments of the present invention, the operations according to the embodiments of FIG. 6 may further include receiving information about an alternative route from the management terminal of the parking lot or the fire station terminal when escape to a ground surface from a floor further away from the ground surface than the electric vehicle charging system is impossible.

According to various embodiments of the present invention, when escape to the ground surface from a floor further away from the ground surface than the electric vehicle charging system is impossible, and when each of the other electric vehicle charging systems belongs to the third tier, the content of the visual warning information and the auditory warning information may include visual sign information and a guidance voice providing guidance on a direction of an escape exit positioned on an alternative route.

According to various embodiments of the present invention, an electric vehicle charging system is provided. The electric vehicle charging system includes a charger for an electric vehicle, a fire detection device including a temperature sensor and a gas detection sensor for detecting a fire in an electric vehicle charging space for the electric vehicle, a frame of the electric vehicle charging space, a fireproof cover covering both side surfaces, a rear surface, and an upper end of the electric vehicle charging space based on the frame, a rollable door at the front of the electric vehicle charging space, a fire extinguishing device for the electric vehicle charging space, a warning output device including a visual warning device and an auditory warning device, a transceiver, a memory, and a processor functionally connected to the charger, the fire detection device, the rollable door, the fire extinguishing device, the warning output device, the transceiver, and the memory. The memory stores instructions for operations performed by the processor. The operations may include some or all operations of the method of operating the electric vehicle charging system according to the embodiments of FIG. 6.

According to various embodiments of the present invention, there is provided a computer program which is configured to allow a communication system to perform the method of operating the electric vehicle charging system according to the embodiment of FIG. 6 and is recorded on a computer-readable storage medium.

When the embodiment of the present invention is implemented using hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided.

Meanwhile, the above-described method may be written as a program that can be executed by a computer and may be implemented in a general-purpose digital computer that can execute the program using computer-readable recording media. In addition, a data structure used in the above-described method can be recorded on a computer-readable storage medium through various methods. It should be understood that program storage devices that can be used to describe storage devices including computer code executable to perform various methods of the present invention do not include temporary objects such as carrier waves or signals. The computer-readable storage media include storage media such as magnetic recording media (for example, a read-only memory (ROM), a floppy disk, and a hard disk) and optical readable media (for example, a CD-ROM) and a DVD).

The above-describe embodiments are implemented by combining the components and the features of the present invention in a predetermined form. Each component or feature should be considered as being selective unless explicitly described separately. Each component or feature may be practiced in a form in which it is not combined with other components or features. In addition, the embodiments of the present invention may be configured by combining some components and/or features. An order of the operations described in the embodiments of the present invention may be changed. Some components or features of any of the embodiments may be included in other embodiments or may be replaced by the corresponding components or features of other embodiments. It is apparent that the embodiments may be configured by combining claims which do not have an explicitly cited relation in the claims and may be included in new claims which are amended after filing.

It is apparent to those skilled in the art that the embodiments of the present invention may be embodied in other specific forms without departing from the technical idea and essential features of the present invention. Accordingly, the above embodiments should be considered in all respects as illustrative rather than restrictive. The scope of the present invention is to be determined by a reasonable interpretation of the appended claims and all changes within an equivalent range of the present invention.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

The present invention may provide a method and apparatus for preventing the spread of damage due to a fire in an electric vehicle charging station in a building parking lot in a communication system.

In addition, the present invention may provide a method and apparatus in which, when a fire is detected in one charging station of a plurality of electric vehicle charging stations installed in a building parking lot in a communication system, the charging station is closed, and a plurality of charging systems cooperate with each other to provide an optimal escape route as well as a warning according to a fire situation, thereby minimizing the spread of damage and quickly responding to the fire.

In addition, the present invention may provide a method and apparatus in which a plurality of electric vehicle charging systems communicate with each other in real time when a fire occurs so that each system receives a fire warning and shares whether the fire has spread, thereby enabling a cooperative response.

In addition, the present invention may provide a method and apparatus in which each charging system adjusts the intensity of a warning according to a distance from the origin of a fire, a position, and a spatial relationship so that a closer system outputs a stronger warning, and unnecessary response actions are excluded to enable an efficient response.

In addition, the present invention may provide a method and apparatus in which a plurality of charging systems provide guidance on an optimal escape route based on whether a fire has spread, and simultaneously provide a warning, position information of the origin of the fire and escape guidance in order for users to safely evacuate, enhancing real-time collaboration.

In addition, the present invention may provide a method and apparatus for efficiently preventing the spread of a fire throughout a parking lot and excluding unnecessary actions by periodically sharing a fire state between charging systems and automatically determining to take only necessary response actions.

The effects obtainable in the present invention are not limited to the effects described above, and other effects that are not described will be clearly understood by a person skilled in the art from the description below.

Although the present invention has been described with various embodiments, various changes and modifications may be suggested to one skilled in the art. It is intended that the present invention encompasses such changes and modifications as fall within the scope of the appended claims.

What is claimed is:

1. An electric vehicle charging system comprising:
   a charger for an electric vehicle;
   a fire detection device including a temperature sensor and a gas detection sensor to detect a fire in an electric vehicle charging space for the electric vehicle;
   a frame of the electric vehicle charging space;
   a fireproof cover configured to cover both side surfaces, a rear surface, and an upper end of the electric vehicle charging space based on the frame;
   a rollable door at a front of the electric vehicle charging space;
   a fire extinguishing device for the electric vehicle charging space;
   a warning output device including a visual warning device and an auditory warning device;
   a transceiver;
   a memory; and
   a processor functionally connected to the charger, the fire detection device, the rollable door, the fire extinguishing device, the warning output device, the transceiver, and the memory,
   wherein the memory stores instructions for operations performed by the processor, and the operations include:
   detecting, by the fire detection device, the fire in the electric vehicle charging space;

outputting, by the warning output device, a warning of the fire;
cutting off power supply of the charger;
closing the rollable door;
after closing the rollable door, spraying, by the fire extinguishing device, a fire extinguishing agent into the electric vehicle charging space,
wherein information output by the warning output device includes a visual sign and an auditory sign indicating that the electric vehicle charging system is an origin of the fire,
wherein the electric vehicle charging system is one of a plurality of electric vehicle charging systems in a parking lot including the electric vehicle charging system,
wherein each of the plurality of electric vehicle charging systems has the same structure as the electric vehicle charging system,
wherein the operations further include:
transmitting a message notifying other electric vehicle charging systems included in the plurality of electric vehicle charging systems of detection of the fire in the electric vehicle charging system and a position of the electric vehicle charging system;
generating, by the fire detection device, state information of the fire at a preset period until the fire is extinguished, wherein the state information includes an extent of occurrence of the fire or an extent of extinguishment of the fire after the spraying, by the fire extinguishing device, the fire extinguishing agent;
determining fire response stage information of each of the other electric vehicle charging systems based on the fire state information at the preset period;
transmitting the fire response stage information to the other electric vehicle charging systems at the preset period; and
transmitting a message notifying a management terminal of the parking lot, a fire station terminal, and one or more user terminals registered in relation to the parking lot of the detection of the fire and the position of the electric vehicle charging system,
wherein the fire response stage information includes warning stage information of the fire and response operations to be performed by each of the other electric vehicle charging systems in response to receiving the warning stage information,
wherein the response operations include one or more of an operation of outputting a warning of the fire, an operation of cutting off power supply of the charger in each of the other electric vehicle charging systems, an operation of closing the rollable door, and an operation of spraying the fire extinguishing agent, and
wherein, in each of the other electric vehicle charging systems, the warning of the fire is output based on the warning stage information,
wherein the memory further includes arrangement information of the plurality of electric vehicle charging systems in the parking lot,
wherein the warning stage information is generated based on a hierarchy according to a distance from each of the other electric vehicle charging systems to the electric vehicle charging system, and a floor difference,
wherein the warning stage information includes visual warning information and auditory warning information,
wherein, as a tier in the hierarchy determined for each of the other electric vehicle charging systems becomes higher, brightness and a blinking frequency of the visual warning information are increased, and a color of the visual warning information is changed, and
wherein, as the tier in the hierarchy determined for each of the other electric vehicle charging systems becomes higher, a volume or a frequency of the auditory warning information is increased.

2. The electric vehicle charging system of claim 1, wherein the electric vehicle charging system further comprises: an inflatable pool capable of wrapping a lower end of the electric vehicle; and a liquid supply device capable of supplying a liquid such as water or a coolant to the inflatable pool while controlling a water level,
wherein the processor is functionally connected to the inflatable pool and the liquid supply device,
wherein the operations further comprise: inflating and deploying the inflatable pool; and supplying, by the liquid supply device, the liquid such as the water or the coolant to the inflatable pool,
wherein the liquid supply device is configured to control a water level of the liquid such as the water or the coolant in the inflatable pool according to an extent of the fire,
the liquid supply device is configured to, until a threshold fire duration immediately after the fire occurs, control the water level of the liquid to be lower than a threshold level such that only a portion of a battery pack of the electric vehicle is submerged, and
the liquid supply device is configured to, when a temperature in the system exceeds a threshold temperature or a concentration of a specific gas in the system exceeds a threshold concentration and thermal runaway of the battery pack of the electric vehicle is detected, or when the fire continues for the threshold fire duration or more, adjust the water level of the liquid to be lower than the threshold level such that an entirety of the battery pack of the electric vehicle is submerged.

3. The electric vehicle charging system of claim 2, wherein an operation of the fire extinguishing device and operations of the inflatable pool and the liquid supply device are performed complementary to each other,
the liquid supply device is configured to, when the fire extinguishing device does not operate normally despite control of the operation of the fire extinguishing device, raise the water level of the liquid in the inflatable pool to be higher than a normal level, and an extent to which the liquid supply device raises the water level of the liquid to be higher than the normal level is based on an extent of abnormality of the fire extinguishing device,
the fire extinguishing device is configured to, when the inflatable pool is not inflated and disposed normally or the liquid supply device is not operated normally despite the control of the operations of the inflatable pool and the liquid supply device, increase a spray pressure of the fire extinguishing agent sprayed by the fire extinguishing device to be higher than a normal level, and an extent to which the fire extinguishing device increases the spray pressure of the fire extinguishing agent to be higher than the normal level is based on an extent of abnormality of the inflatable pool or the liquid supply device,
the electric vehicle charging system further includes a spray pressure sensor configured to measure the spray pressure of the fire extinguishing device, and an ultrasonic water level sensor configured to measure the water level of the liquid in the inflatable pool, the extent of abnormality of the fire extinguishing device is based on a ratio of the spray pressure expected based on the control of the operation of the fire extinguishing device to the spray pressure measured by the spray pressure sensor of the fire extinguishing device, and the extent of abnormality of the inflatable pool and the liquid supply device is based on a ratio of the water level expected based on the control of the operations of the inflatable pool and the liquid supply device to the water level of the liquid in the inflatable pool measured by the ultrasonic water level sensor.

4. The electric vehicle charging system of claim 1, wherein, in the hierarchy of each of the other electric vehicle charging systems, each of the other electric vehicle charging systems belongs to a first tier when each of the other electric vehicle charging systems corresponds to the same floor as the electric vehicle charging system and is within a threshold distance from the electric vehicle charging system, each of the other electric vehicle charging systems belongs to a second tier when each of the other electric vehicle charging systems corresponds to the same floor as the electric vehicle charging system and is outside the threshold distance from the electric vehicle charging system, each of the other electric vehicle charging systems belongs to a third tier when each of the other electric vehicle charging systems corresponds to a different floor from the electric vehicle charging system and corresponds to a floor that is further away from a ground surface than the electric vehicle charging system, and each of the other electric vehicle charging systems belongs to a fourth tier when each of the other electric vehicle charging systems corresponds to a different floor from the electric vehicle charging system and corresponds to a floor that is closer to the ground surface than the electric vehicle charging system, wherein the threshold distance is any distance between 30 meters and 50 meters, the first tier, the second tier, the third tier, and the fourth tier are in order of height, and the first tier is highest among the first tier, the second tier, the third tier, and the fourth tier.

5. The electric vehicle charging system of claim 4, wherein the response operations to be performed by each of the other electric vehicle charging systems in response to receiving the warning stage information are different according to the hierarchy of each of the other electric vehicle charging systems, when each of the other electric vehicle charging systems belongs to the first tier, the response operations include outputting the warning of the fire at a first intensity as well as in a red visual sign, cutting off power supply of the charger, closing the rollable door, spraying the fire extinguishing agent, inflating and deploying the inflatable pool, and supplying the liquid such as the water or the coolant to the inflatable pool, when each of the other electric vehicle charging systems belongs to the second tier, the response operations include outputting the warning of the fire at a second intensity as well as in an orange visual sign, cutting off power supply of the charger, closing the rollable door, and spraying the fire extinguishing agent under a condition in which a temperature in each of the other electric vehicle charging systems exceeds a threshold temperature or a concentration of a specific gas exceeds a threshold concentration, when each of the other electric vehicle charging systems belongs to the third tier, the response operations include outputting the warning of the fire at a third intensity as well as in a yellow visual sign, cutting off power supply of the charger and closing the rollable door under a condition in which the temperature in each of the other electric vehicle charging systems exceeds the threshold temperature or the concentration of the specific gas exceeds the threshold concentration, and when each of the other electric vehicle charging systems belongs to the fourth tier, the response operations include outputting the warning of the fire at a fourth intensity as well as in a green visual sign, and cutting off power supply of the charger under a condition in which the temperature in each of the other electric vehicle charging systems exceeds the threshold temperature, wherein the threshold temperature is any temperature between 60 degrees Celsius and 75 degrees Celsius or any temperature between 140 degrees Fahrenheit and 167 degrees Fahrenheit, the threshold concentration of the specific gas is any carbon monoxide concentration of 50 ppm to 100 ppm, a carbon dioxide concentration of 1000 ppm, or a concentration of a volatile organic compound (VOC) of 0.5 ppm to 1 ppm, an intensity of the warning is related to the brightness, the blinking frequency, and a color of the visual warning information and the volume or the frequency of the auditory warning information, the first intensity, the second intensity, the third intensity, and the fourth intensity are in order of height, and the first intensity is highest among the first intensity, the second intensity, the third intensity, and the fourth intensity.

6. The electric vehicle charging system of claim 4, wherein the brightness, the blinking frequency, and the color of the visual warning information included in the warning stage information and the volume or the frequency of the auditory warning information are determined according to the hierarchy, content of the visual warning information includes visual sign information providing guidance on a direction of an escape exit in the parking lot, and when each of the other electric vehicle charging systems belongs to the first tier, the content of the visual warning information further includes position information of the electric vehicle charging system corresponding to the origin of the fire, and content of the auditory warning information includes a voice providing guidance on a direction of the escape exit.

7. The electric vehicle charging system of claim 6, wherein, when each of the other electric vehicle charging systems belongs to the first tier or the second tier, the content of the visual warning information and the auditory warning information includes information about a distance from each of the other electric vehicle charging systems to the electric vehicle charging system, visual sign information and a guidance voice, providing guidance on a direction of an escape exit positioned away from the electric vehicle charging system when each of the other electric vehicle charging systems belongs to the third tier, the content of the visual warning information and the auditory warning information includes the information about the distance from each of the other electric vehicle charging systems to the electric vehicle charging system, the visual sign information and the guidance voice providing guidance on the direction of the escape exit positioned away from the electric vehicle charging system, and when each of the other electric vehicle charging systems belongs to the fourth tier, the content of the visual warning information and the auditory warning information includes the information about the distance from each of the other electric vehicle charging systems to the electric vehicle charging system, visual sign information and the guidance voice providing guidance on a direction of an escape exit positioned closest to each of the other electric vehicle charging systems.

8. The electric vehicle charging system of claim 6, wherein the operations further include receiving information about an alternative route from the management terminal of the parking lot or the fire station terminal when escape to a ground surface from a floor further away from the ground surface than the electric vehicle charging system is impossible, and when the escape to the ground surface from the floor further away from the ground surface than the electric vehicle charging system is impossible, and when each of the other electric vehicle charging systems belongs to the third tier, the content of the visual warning information and the auditory warning information includes visual sign information and a guidance voice providing guidance on a direction of an escape exit positioned on an alternative route.

\* \* \* \* \*